United States Patent [19]
McHugh et al.

[11] Patent Number: 5,697,552
[45] Date of Patent: Dec. 16, 1997

[54] SETPOINT LIMITING FOR THERMOSTAT, WITH TAMPER RESISTANT TEMPERATURE COMPARISON

[76] Inventors: Thomas K. McHugh, 127 Hewett Rd., Wyncote, Pa. 19095; Arthur L. Steadman, Jr., 4727 Melon St., Philadelphia, Pa. 19139

[21] Appl. No.: 655,721

[22] Filed: May 30, 1996

[51] Int. Cl.$^6$ ............................ G01K 7/00; G05D 15/00
[52] U.S. Cl. ..................... 236/78 B; 62/158; 165/270; 374/169
[58] Field of Search ..................... 236/46 R, 78 D, 236/78 B; 165/270; 62/229, 158; 374/169

[56] References Cited

U.S. PATENT DOCUMENTS

| | | | |
|---|---|---|---|
| 2,488,580 | 11/1949 | Burleigh, Jr. | 236/78 B |
| 3,323,723 | 6/1967 | Mayo | 236/46 |
| 3,753,194 | 8/1973 | Krisco | 337/331 |
| 3,927,829 | 12/1975 | Willner et al. | 236/92 |
| 4,270,693 | 6/1981 | Hayes | 236/46 |
| 4,755,786 | 7/1988 | Shanahan et al. | 337/323 |
| 4,773,587 | 9/1988 | Lipman | 236/11 |
| 5,161,606 | 11/1992 | Berkeley et al. | 165/1 |

FOREIGN PATENT DOCUMENTS

| 2084738 | 3/1982 | United Kingdom | 62/158 |
|---|---|---|---|

*Primary Examiner*—William E. Wayner
*Attorney, Agent, or Firm*—Eckert Seamans Cherin & Mellott

[57] ABSTRACT

A thermostat for heating or cooling, operative to maintain an indoor air temperature to a limited setpoint range, is provided with a comparison circuit to prevent tampering intended to exceed a setpoint limit. A first temperature sensor responds to ambient air temperature and can include a first thermistor. A second thermistor is partly thermally isolated from the air, and senses a reference temperature that lags temperature changes in the ambient air. The two thermistors form a voltage divider coupled to one input of a differential amplifier comparator, the other input of which is coupled to a fixed voltage reference. When the ambient and reference temperatures exceed a predetermined temperature difference, the differential amplifier operates a relay that breaks a circuit including the contacts. This occurs when locally cooling the ambient air to generate a spurious call for heat (or vice versa). Two differential comparators can be included to sense positive or negative differences between the ambient and reference temperatures, and can be set to respond to different temperature differences using jumpers. A third temperature sensor can be similarly coupled to a low temperature responsive differential comparator that inhibits operation of the tamper-resistant circuit at an absolute low safety threshold temperature (i.e., to permit a call for heat), and/or coupled to a high temperature responsive comparator, to block a call for heat redundantly, above a high temperature threshold.

11 Claims, 3 Drawing Sheets

SETPOINT LIMITING FOR THERMOSTAT, WITH TAMPER RESISTANT TEMPERATURE COMPARISON

BACKGROUND OF THE INVENTION

1. Field of the Invention

The invention relates to regulation of heating, ventilation and air conditioning equipment via a thermostatic control, especially with a limited setpoint range for conservation of energy.

For use with any thermostat with an ambient temperature sensor, an auxiliary temperature sensor, a temperature comparison circuit and associated gating are provided to enable or disable switching by the thermostat. The device detects temperature conditions characteristic of an attempt to generate a call for heating or cooling by locally cooling or heating the thermostat, respectively, and disables switching in that event.

2. Prior Art

Thermostats for control of heating, ventilation and air conditioning systems typically have a range of adjustment whereby the thermostat can be set to generate a call for heat when the ambient temperature falls below a desired minimum temperature setpoint for an air space, and/or a call for cooling when the temperature exceeds a setpoint. For heating, for example, the typical thermostat produces a switch closure that triggers a furnace or the like to emit heat into the air space. A thermostat may be adapted to control both heating and cooling, either with a single setpoint adjustment device and a means for switching between heating and cooling, or a dual setpoint device that permits the ambient temperature to vary within a range between two setpoints or within a certain temperature above or below a given setpoint. In any event, the object is to permit adjustment of the setpoints to a temperature that is considered appropriate.

Normally, the thermostat is capable of operating at any setpoint in a range that spans from the coolest temperature to the warmest temperature that any customer may find desirable. However, it is not always desirable to provide users with full freedom to adjust the setpoints of thermostats. Heating or cooling requires power and generates an expense. Therefore, it may be desirable to preclude or to limit the user's ability to adjust the setpoint. For example, an entity who pays for heating or cooling may wish to limit energy costs by setting a thermostat setpoint immovably to a conservative temperature, or to limit the range of setpoints to temperatures that the entity considers sufficient under the circumstances. In the example of a heated space, a limited upper setpoint temperature is not necessarily uncomfortable, but instead may simply encourage the occupants to wear long sleeves or sweaters where they might not otherwise, while conserving energy and expense.

The same considerations are applicable for limiting the range of setpoints for heating and for cooling, because both involve using energy and incurring expense. In this disclosure, limitation of heating by imposing a high temperature maximum setpoint or a fixed setpoint is used as an example. It will be appreciated that the discussion also encompasses limitation of cooling by imposing a low temperature minimum setpoint value.

It is not uncommon, especially in public places, to employ thermostats that are locked under a key-locked cover, and are therefore inaccessible for any adjustment by an occupant who has no key. The particular setpoint temperature is chosen arbitrarily, preferably so as to conserve energy. However, particular occupants could conceivably be comfortable using even less energy than is used at the arbitrarily chosen temperature. It would be advantageous to permit occupants to adjust the thermostat within a range having a conservative endpoint, i.e., to impose an uppermost heating setpoint limit (and/or a lowermost cooling one) and otherwise to permit adjustments.

A setpoint control typically has inherent electrical or mechanical limitations on the range of possible setpoints. For example, a slide lever setpoint control usually has endpoints at which the control lever encounters a mechanical abutment and can go no further. It would be possible to set the thermostat relative to such an abutment so that the abutment is encountered at a conservative setpoint limit value. This is a mechanical limitation similar to locking the thermostat under a cover, because the effect is to deny access to adjust the thermostat to a setpoint beyond the limit value. Similar limitations can be inherent in other forms of setpoint controls such as potentiometers, which likewise have inherent maximum and minimum settings.

It has been found, however, that such inherent limitations are ineffective and easily overcome. In connection with heating, an occupant can take various steps to cool the local area of the thermostat (without cooling the ambient space generally), causing the thermostat to generate a call for heat to the airspace when the general ambient temperature actually exceeds the thermostat setpoint. For example, occupants can place a damp cloth or paper towel on the thermostat to produce local evaporative cooling that lowers the air temperature sensed by the thermostat. A plastic bag with a few ice cubes can cool the air around the thermostat by convection, or by conduction with the thermostat casing or other structures. The occupants can also open a door or window near the thermostat to produce a call for heat that drives up the temperature in other areas of a heated space. One can envision comparable activities for locally heating a cooling thermostat to generate a call for cooling. These activities defeat the imposition of a conservative setpoint limit, and may waste more energy than permitting the occupants a wider range of adjustment.

Depending on the difference between inside and outside temperatures, power requirements for heating or cooling can be reduced substantially if the thermostat setpoint is adjusted to more closely approximate the outside temperature. It is estimated in the mid-Atlantic region, for example, that 2.5% of the annual heating bill of a home or the like can be saved for each degree fahrenheit by which the temperature is lowered in the range above 70° F. (which is considered a nominal heating setpoint). That is, by reducing a thermostat setting from 85° to 75° F. the annual heating bill is reduced by fully 25%, and from 85 to 70 the reduction is 37.5%.

Various entities supply power to heat (or cool) spaces, and may reasonably wish to limit the endpoints to which temperature control setpoints can be adjusted. Schools, rental properties where utility bills are included in the rent, government buildings and the like are examples. As stated above, such action is reasonable in that energy can be conserved by inducing occupants to wear sweaters and the like as appropriate, with no substantial reduction in comfort.

As another pertinent example, a municipal power authority may choose to limit heating, for example to a cool but not uncomfortable maximum setpoint of 65° or 70° F., for customers who become seriously delinquent in paying utility bills. This can be done by installing a thermostat with inherent mechanical or electrical endpoints beyond which the thermostat cannot be adjusted. Imposed conservative setpoint limits are a humanitarian alternative to disconnecting the customer's service altogether, and can provide an incentive for the customer to become current in payments. However, if the endpoint limits can be readily defeated, and such a customer easily can cause the setpoint limited thermostat to call for heat up to 75° or 80° F. with little or no incentive to conserve because they are not paying anyway, there is a problem. Where a nonpaying customer who likes it hot achieves this by an open door or window near the thermostat that further wastes energy, the problem is worse yet.

What is needed to avoid tampering is a thermostat that does not simply respond to the ambient air temperature at the thermostat. But this is inconsistent with the basic objective of the thermostat to sense and control the ambient temperature by generating calls for heat (or cooling) as a function of the ambient temperature passing a setpoint.

The present invention provides a solution that ensures that the thermostat cannot be tampered with by locally cooling the thermostat of a heating system (or heating the thermostat of a cooling system). This is accomplished by detecting the occurrence of a predetermined temperature difference between ambient air and a protected zone, which is characteristic of tampering. The threshold temperature difference for detecting tampering is small, but greater than the normal variation of temperature due to hysteresis in the cyclic operation of the heating or cooling system. The invention then disables the thermostat output. By disabling the thermostat output during tampering, at least unless the temperature falls to a dangerously low level at which pipes may freeze and the like, the invention conserves energy and provides a disincentive to tamper with the thermostat in the future.

SUMMARY OF THE INVENTION

It is an object of the invention to conserve energy in a heating or cooling system by providing an effective setpoint limit for a thermostat, namely by imposing at least one setpoint limit on the thermostat in a manner protected from tampering.

It is also an object of the invention to detect tampering with a setpoint-limited thermostat by sensing a predetermined temperature difference between ambient air temperature (i.e., room temperature) and the temperature of a protected zone not subject to short term temperature change due to a change in ambient temperature.

It is a further object to provide a setpoint limiting circuit that can be used to ensure conservative setpoint limits for a general purpose thermostat.

It is another object to disable a setpoint limited thermostat to prevent operation of a heating or cooling system upon detection of an instance of misuse.

It is another object to inhibit operation of the tamper-detection device (i.e., to enable heating), if the temperature passes a low setpoint suggesting that the premises has become dangerously cold.

These and other objects are accomplished by a thermostat for heating or cooling that maintains an indoor air temperature to a limited setpoint range and is not readily defeated because it senses and compares ambient temperature (which a user can alter) with a protected temperature that is thermally insulated from ambient and therefore responds more slowly to temperature changes. A first temperature sensor responds to ambient air temperature, for example a first thermistor mounted adjacent to a bimetal switched contact.

A second thermistor is partly thermally isolated from the air, and senses a reference temperature that lags temperature changes in the ambient air. The two thermistors form a voltage divider coupled to one input of a differential amplifier comparator, the other input of which is coupled to a fixed voltage reference. When the ambient and reference temperatures exceed a predetermined temperature difference, the differential amplifier operates a relay that breaks the control circuit. This occurs when locally cooling the ambient air to generate a spurious call for heat (or vice versa). Two differential comparators can be included to sense positive or negative differences between the ambient and reference temperatures, and can be set to respond to different temperature differences using jumpers. A third temperature sensor can be similarly coupled to a high/low temperature responsive differential comparator that inhibits operation of the differential amplifier circuit when at or above an absolute low safety threshold temperature and opens the relay to break the heating (cooling) control circuit when at or above a redundant high threshold temperature.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
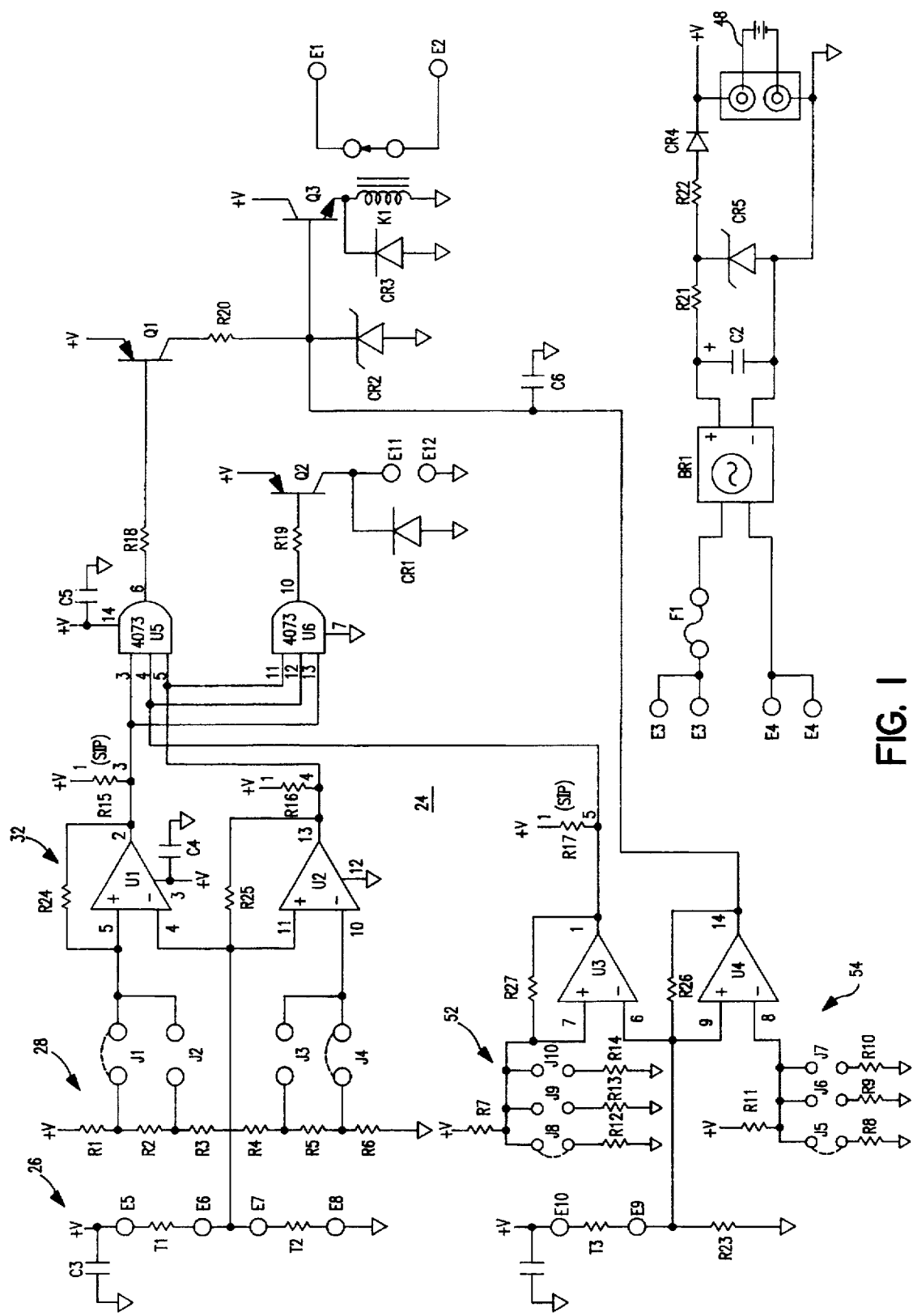
FIG. 1 is a schematic circuit diagram for use with a thermostat according to the present invention.

Referring to the schematic circuit diagram in FIG. 1, a circuit 24 has at least two and preferably three temperature sensors T1–T3, which can be thermistors characterized by a change in resistance as a function of their temperature. As a general description of the device, the temperature sensors are coupled to form voltage dividers 26 that provide input signals to differential amplifiers U1–U4, which are configured as comparators. The second inputs of the respective comparators are coupled to fixed resistance voltage dividers 28 that define particular temperature levels or temperature differences. The outputs of comparators U1–U4 are coupled to the inputs of at least one gate U5, the output of which controls a relay K1 having normally closed contacts E1, E2. These contacts are coupled in series with the normally open switched contacts 34 of a thermostat 22 (see FIG. 2), such that when contacts E1, E2 are open, the thermostat cannot generate a call for heat (or cooling) to the HVAC system 36, regardless of the state of the thermostat contacts or any signal that the thermostat might generate.

Figure 2:
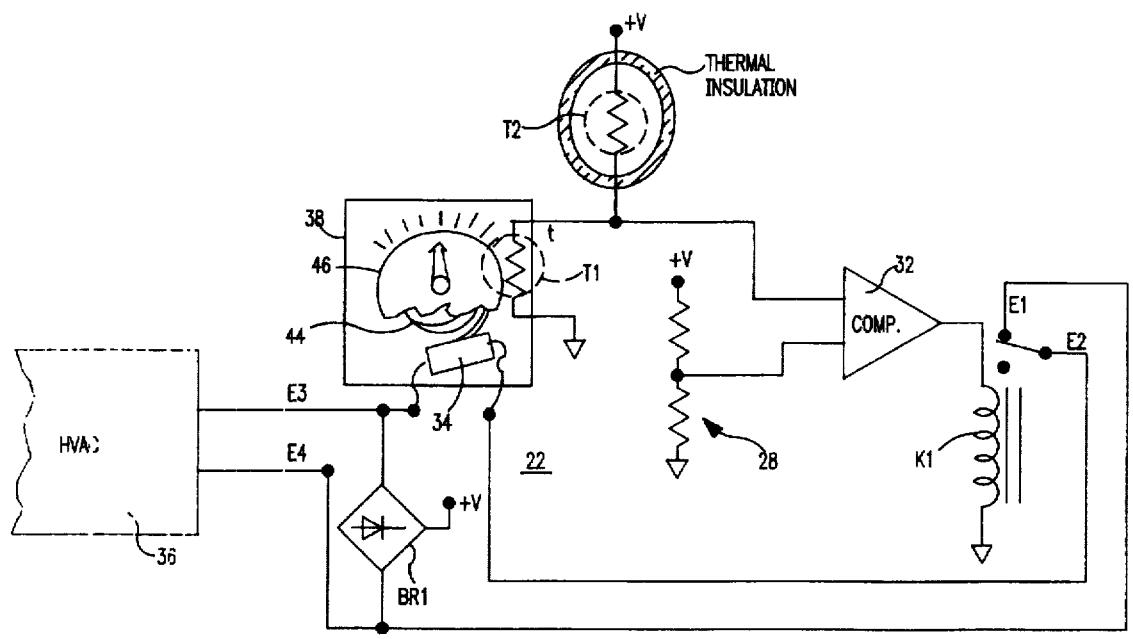
FIG. 2 is a block diagram illustrating the functional units of a heating or cooling system employing the thermostat.
Figure 3:
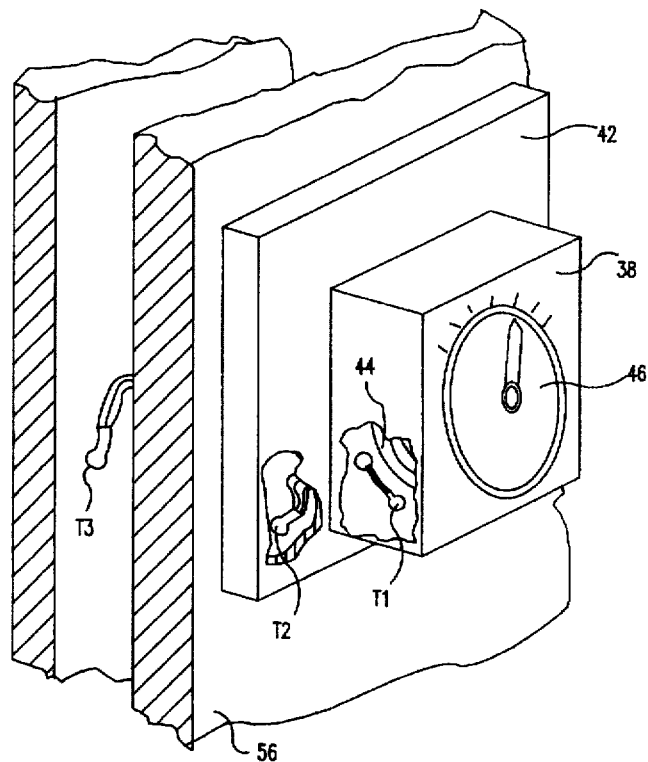
FIG. 3 is an elevation view, partly in section, showing the physical mounting of the thermostat.

FIG. 2 is a block diagram showing generally the functional units of a heating or cooling system that employs a conventional thermostat 38 plus the circuit 24 of the invention as shown in FIG. 1, and FIG. 3 is an elevation view, partly in section, showing the physical mounting of the thermostat 38.

In the embodiment shown, a conventional wall thermostat 38 such as a Robertshaw model 200–403 is mounted on a base 42 containing the circuit 24 shown in FIG. 1. The thermostat 38 has a bimetal band 44 wound like a clock spring and mounted on a manually rotatable control disc 46 that controls the angular position of the bimetal band 44 within a range of temperature setpoints. The closure contacts preferably are provided as a magnetic reed switch responsive to movement of the bimetal band, such that uneven thermal expansion of the bimetal winds or unwinds the clock spring bimetal winding, to close or open the contacts by bringing a magnet and reed switch into proximity or out of proximity.

The invention is applicable to any form of thermostat. For example, the call for heat can be generated as by contact closure, an active switched element such as a triac, transistor or SCR, a pulse signal, etc. An arrangement also possible in which a bimetal or the like tips a mercury switch to cause the mercury switch contacts to close. However, a mercury switch is sensitive to the tilt of the unit as a whole. A non-rotatable thermostat mounting and special fasteners to preventing access, are desirable if a mercury switch is used, to prevent tilting of the mounting of the thermostat to defeat setpoint limitations. With a magnetic switch arrangement, manual adjustment of the control disc varies the setpoint, but operation is independent of the housing's tilt angle.

The thermostat 38 can have a fixed setpoint or a setpoint range that is limited, at least for one of heating and cooling, as an energy saving feature. For heating, for example, the thermostat can have a maximum setpoint temperature of approximately 75° F. (24° C.), and preferably has a substantial low temperature range, for example to be used to keep pipes from freezing when the building is not occupied and heating is not required, e.g., with a minimum temperature of 39° F. (4° C.).

With variation of the ambient temperature, thermostat 38 generates a signal calling for at least one of heating and cooling, for maintaining a temperature of indoor air to be heated or cooled and to maintain the setpoint temperature defined by the thermostat. The signal generated is a contact closure by switch 34, occurring as the ambient temperature passes the setpoint. For purposes of this disclosure the invention will be discussed with respect to the example of heating, in which case the closure occurs when the ambient temperature drops to below the setpoint, enabling operation of the heating unit 36 and heating the ambient air back above the setpoint. It will be appreciated that the invention is fully applicable to cooling as well, in which event the signal calling for cooling would occur when ambient temperature is higher than the setpoint.

The bimetal-controlled switch is a form of temperature sensor. However, according to the invention an electrical signal is generated to represent certain temperatures, using a first temperature sensor T1 responsive to the ambient temperature of the air. Temperature sensor T1 comprises a thermistor, namely a resistor having an electrical resistance that varies with its temperature. Temperature sensor T1 is mounted in direct association with the bimetal 44 of thermostat 38, preferably extending from the base of the unit into the area where the bimetal is located, and therefore responding to the same ambient temperature as the bimetal.

It is possible to apply the invention to any thermostat, including an electronic thermostat wherein temperature sensor T1 is employed to the exclusion of a bimetal or similar structural switching means. In any event, with variations in temperature, the first temperature sensor responds, and switching means generate a signal calling for one of heating and cooling when the ambient temperature and the setpoint temperature differ, and the ambient temperature is to be changed to approach the setpoint temperature.

The problem remains that although the setpoint is fixed or the heating range of adjustment provided by the thermostat has a limited endpoint, such as an upper heating endpoint of 75° F. in the example, the thermostat can be fooled by subjecting it to a local change of ambient temperature. Thermostat 38 can be draped with a wet cloth to cool it by evaporative cooling, subjected to ice or a directed draft of cold air, etc., whereupon the thermostat will call for heat even when the general ambient temperature otherwise is above the setpoint. According to the invention, such local temperature variations are detected using a second temperature sensor T2 and a comparator that determines when the signals from sensors T1 and T2 become unbalanced.

Second temperature sensor T2 is thermally partly insulated from the ambient air at the thermostat. For example, sensor T2 can be contained in the base or housing 42 that holds the circuit 24 of the invention, whereas sensor T1 is wired through the housing into the open. The temperature inside housing 42, which is not directly subjected to ambient air, provides a reference temperature. Over a long time, the reference temperature will be equal to the ambient temperature. When there is a change in ambient temperature, the change is detected immediately by sensor T1, but the thermal insulation of sensor T2 is such that some time must occur for the air inside housing 42 to approach the new ambient air temperature. Changes in the reference temperature lag corresponding changes in the ambient temperature.

As shown in FIGS. 1 and 2, means are provided for comparing the ambient temperature and the reference temperature. In the event that the reference temperature differs from the ambient temperature by a predetermined amount, relay K1 is operated and its contacts in series with the switch contacts of the thermostat open the thermostat circuit and prevent the generation of a call for heat to the heating unit. The device is thus rendered insensitive to local cooling (or heating) of the ambient air as a means to force a call for heating (or cooling) when the general ambient air temperature does not justify the call.

The invention is operable with various forms of thermostats and in various circuits. The embodiment shown has an accessible manual setpoint control for adjusting the setpoint temperature, at least within a range having a limited endpoint temperature. However, the invention will also prevent triggering of a thermostat having a non-adjustable setpoint or a thermostat in which access to the setpoint adjustment is limited by a locked cover, special tool requirement or the like. In either case tampering is detected and the call for heat is disabled by detecting a short term difference between the immediately responsive ambient temperature sensor T1 and the thermally-insulated slow-responding reference temperature sensor T2.

Referring to the schematic diagram in FIG. 1, the equality or inequality of the ambient and reference temperatures are detected using a network of two comparators that respectively detect whether the resistances of the thermistor sensors T1 and T2 are greater or less than one another. Thermistors T1 and T2 should be closely matched to provide equal resistance at equal temperature. The absolute resistance values of T1 and T2 at a given temperature are unimportant in the disclosed circuit, provided they are substantially equal. The ambient or first temperature sensor T1 and the thermally insulated reference or second temperature sensor T2, form a voltage divider 26 between a positive DC voltage +V and ground. This DC voltage can be derived from the control conductors of the HVAC system, which typically have 24 VAC, for operation, and preferably charge a battery 48, whenever the thermostat switch contacts and/or the contacts of relay K1 are open such that the 24 VAC is not shorted at the device.

The 24 VAC control voltage can be obtained by connecting junctions E3 and E4 across the series connection of the thermostat closure contacts 34 and contacts E1 and E2 of relay K1. When either the thermostat contacts are open or contacts E1, E2 are open (or both), the control voltage is coupled to points E3, E4 and to a bridge rectifier BR1. The full wave rectified output is filtered by a capacitor C2. Resistors R21 and R22, together with zener diode CR5, regulate the output voltage, for example to +9 VDC, used to power the circuit and to trickle charge battery 48. Blocking diode CR4 prevents discharge of the battery when the thermostat contacts are closed (calling for heat, etc.) and contacts E1, E2 are closed (no tampering detected). In that event, the DC voltage +V is provided by the battery rather than by the bridge.

When the ambient temperature and the reference temperature are equal, temperature sensor thermistors T1 and T2 have equal resistance, and the junction between them is at half the supply voltage +V. This junction is coupled to the input of the comparator, the other input being coupled to the junction of two resistors in a fixed resistance voltage divider 28 having two taps. In FIG. 1, two comparators U1, U2 are used. Comparator U1 has a fixed resistance voltage reference determined by the choice of jumper J1 or J2, which provide a higher or lower voltage reference, respectively, by virtue of their connections along voltage divider R1–R6. Comparator U2 likewise has a voltage reference determined by a choice of jumper J3 or J4, each of the jumpers being coupled to a different voltage junction along the voltage divider of R1–R6. Comparator U1 changes state when the voltage at the junction of T1 and T2 exceeds the voltage at J1 or J2. Comparator U2 changes state then the voltage at the junction of T1 and T2 is less than the voltage at J3 or J4. Thus the two comparators respond to a temperature difference between the T1 (ambient) and T2 (reference) temperatures outside a permitted range of imbalance, one sensing a positive difference in temperature between T1 and T2, and the other sensing a negative difference.

The particular temperature differences sensed advantageously are small enough to detect the ambient temperature difference of a typical attempt to influence the thermostat but large enough to exceed the normal hysteresis of temperature cycling that occurs when the heating (or cooling) system cycles on and off. According to a preferred embodiment of temperature settings using thermistors T1 and T2 that are accurate to ±1° F., jumpers J1 and J4 are used to set threshold temperature detection at −5° and +5° F. (−1.7° and +2.8° C.) by choice of corresponding resistance values in fixed resistance voltage divider 28. Jumpers J2 and J3 likewise set smaller temperature differences, such as −3° and +3° F. Other specific temperature difference levels are possible as well.

Other components shown in FIG. 1 include capacitors C3 and C4, used as decoupling capacitors, feedback resistors R24 and R25, which together with pull-up resistors R15 and R16 determine the high and low levels of the comparator outputs. Normally, the outputs of the comparators U1 and U2 is high. When either of the comparators produces a true output (a low level), switching means coupled to the output of the comparators, in this case including a gate U5 coupled to switching transistors Q1 and Q3, a relay K1 is energized, opening the normally closed contacts E1, E2 and precluding a call for heat (or cooling) to the HVAC system.

For this purpose, the low-true output of AND gate U5 is coupled to PNP switching transistor Q1 through series resistor R18. Capacitor C5 decouples gate U5. The emitter of transistor Q1 is coupled to the positive supply such that when the base of transistor Q1 goes low, current is conducted through series resistor R20 to the base of NPN output switching transistor Q3. Zener diode CR2 holds the voltage at the base of transistor Q3 to a limit value. Diode CR3 clamps the emitter of transistor Q3 and the coil of relay K1 to snub back EMF when transistor Q3 is switched off. When transistor Q1 begins to conduct, capacitor C6 charges through resistor R20.

The embodiment of the invention according to FIG. 1 includes a third temperature sensor T3. The signal of sensor T3 is coupled in a voltage divider in series with a feed resistor R23, and two comparators U3 and U4 are used in a manner similar to comparators U1, U2, except that comparators U3 and U4 respond to absolute temperature levels rather than temperature differences, because resistor E3 is fixed. The junction of sensor T3 and resistor R23 is coupled to the inverting input of comparator U3 and the noninverting input of comparator U4. A rise in temperature at sensor T3 results in a higher voltage at the junction of sensor T3 and resistor R23, and a drop in temperature reduces the voltage. The other input of comparator U3 is coupled to a fixed voltage divider 52 formed by resistor R7 and one of resistors R12, R13, R14 as selected by a jumper at J8, J9 or J10, for example setting a high temperature thermostat disable temperature of 72°, 74° or 76° F. (22.2°, 23.3° or 24.4° C.). If the ambient temperature exceeds the set value, the output of comparator U3, which is also coupled to AND gate U5, goes low and any thermostat signal is disabled by opening the contacts of relay K1 through switching transistors Q1 and Q3.

The inverting input of comparator U4 is similarly connected to a fixed voltage divider 54 comprising resistor R11 and one of resistors R8, R9 and R10 as selected by a choice of jumper at J5, J6 or J7. Comparator U4 changes state when the temperature detected by sensor T3 falls below a safety low limit, for example 50°, 55° or 60° F. (10.0°, 12.8° or 15.6° C.). The safety low limit could also correspond to the minimum range of thermostat 38, for example 39° F. (4° C.). This causes the output of comparator U4 to go low, discharges capacitor C6 and pulls down the voltage at the base of transistor Q3. In that event, regardless of whether or not temperature sensors T1, T2 and comparators U1, U2 have detected a temperature imbalance, contacts E1, E2 remain closed. Assuming that the switch contacts in the thermostat are closed, a call for heat (etc.) is generated. Operation of the circuit to block a call for heat is inhibited.

As noted above, temperature sensor T1 is mounted in direct exposure to ambient air. Temperature sensor T2 is thermally insulated from ambient, for example being mounted in the base or housing 42 and touching the wall 56 behind and within 1.5 inch (3.7 cm) of thermostat 38. Temperature sensor T3 preferably is disposed in the hollow of the wall 56 behind the thermostat, wired through a drilled hole in the wallboard.

In FIG. 1, gate U6 is coupled in parallel with gate U5, and tracks its output. Gate U6 is coupled to the base of PNP transistor Q2, the collector of which is coupled to a reverse biased diode CR1 and to test point E11. Point E12 is coupled to ground. A signalling device such as a red LED can be coupled to test points E11, E12, or a further relay for signalling or for coupling to an additional device (not shown).

Figure 4:
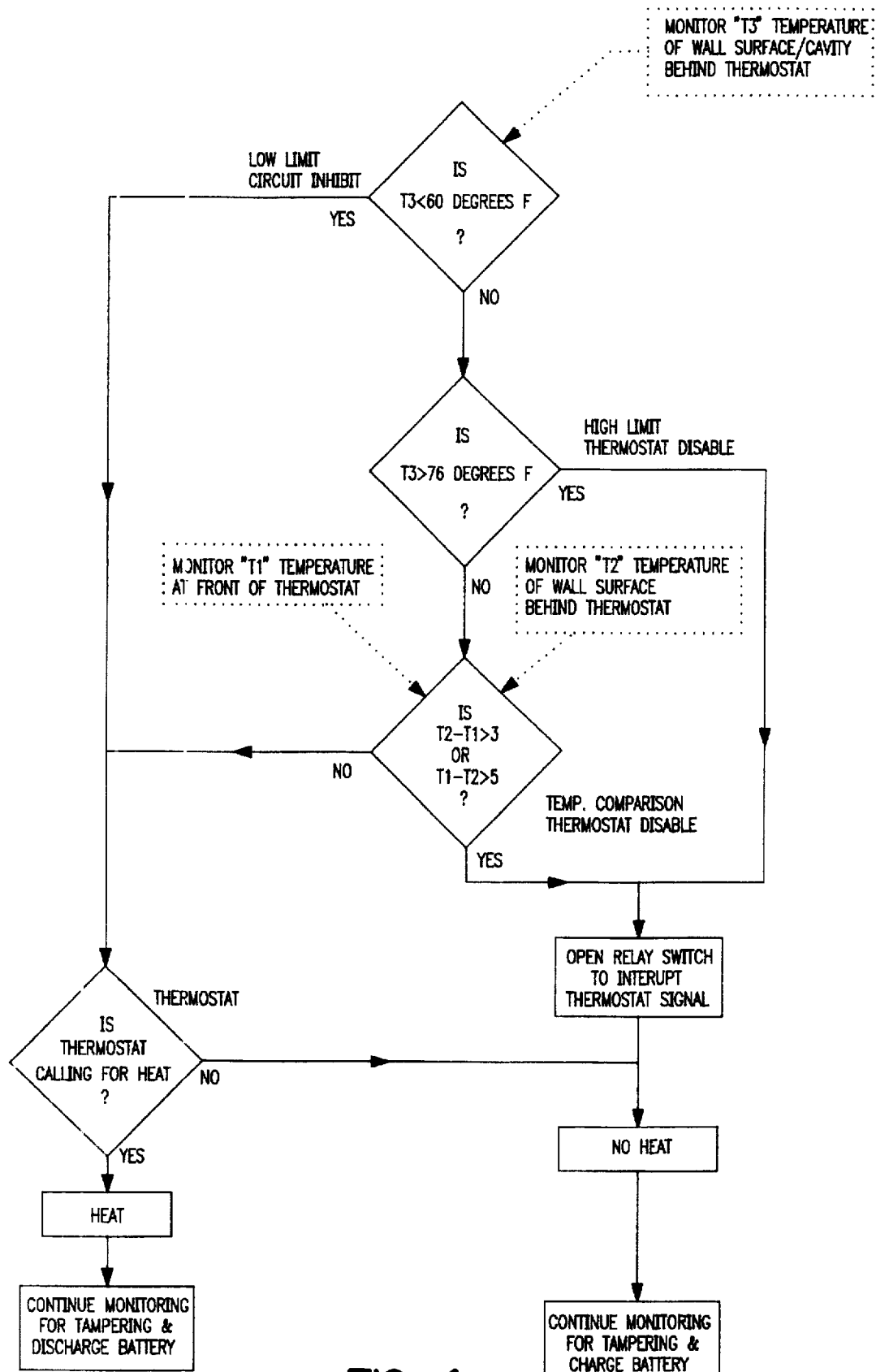
FIG. 4 is a flowchart showing the functional operation of the invention to combat tampering.

FIG. 4 is a flowchart showing the functional operation of the invention to combat tampering, and reflects the hierarchy of functional operations effected by the comparators when wired as in FIG. 2. Regardless of other comparison results, if sensor T3 is at a temperature less than a preset low safety limit, for example a limit that reduces the possibility of pipes freezing on the premises (e.g., 50° F.), then a call for heat from the thermostat will be coupled through to enable the heating system. Likewise, if the temperature of sensor T3 exceeds an upper limit (e.g., 76° F.), contacts E1, E2 will be opened and no call for heat from the thermostat will be coupled through to signal the heating system. Assuming the sensor T3 is between these limits, a call for heat will be coupled through unless sensors T1 and T2 are reporting a difference in temperatures over a few degrees, for example if T2−T1>3° F. or T1−T2>5° F.

Whenever the thermostat switch is open and not calling for heat, without tampering, the HVAC system control voltage powers the circuit and charges battery 48. The battery can be a 9 VDC 100 mA-hour rechargeable battery, and is trickle charged when power is available due to positions of the thermostat contacts and contacts E1, E2. The battery provides up to 40 hours of monitoring without recharge.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An apparatus for a thermostat operable to generate a signal calling for at least one of heating and cooling, for maintaining a temperature of indoor air to be heated or cooled to maintain a setpoint temperature defined by the thermostat, comprising:

a first temperature sensor responsive to an ambient temperature of the air;

switching means responsive to the first temperature sensor, the switching means normally generating the signal calling for said one of said heating and cooling when the ambient temperature and the setpoint temperature differ such that the ambient temperature is to be changed to approach the setpoint temperature;

a second temperature sensor partly thermally insulated from the air, whereby changes in the reference temperature lag corresponding changes in the ambient temperature, the second temperature sensor thereby sensing a reference temperature;

means for comparing the ambient temperature and the reference temperature, and disabling the switching means when the reference temperature differs from the ambient temperature by a predetermined amount, whereby the thermostat is insensitive to local cooling or heating of the ambient air for generating a call for heating or cooling, respectively.

2. The apparatus of claim 1, further comprising a setpoint control operable for manually adjusting the setpoint temperature, the setpoint control having at least one limiting endpoint temperature at which the switching means is operated.

3. The apparatus of claim 2, further comprising a third temperature sensor coupled to a low temperature comparator for determining a low safety threshold temperature associated with the thermostat, the low temperature comparator being operable to inhibit the means for comparing from disabling the switching means at a low temperature safety threshold.

4. The apparatus of claim 1, wherein the first temperature sensor comprises a bimetal thermally responsive switch and a first thermistor, both the thermally responsive switch and the first thermistor sensing the ambient temperature.

5. The apparatus of claim 4, wherein the second temperature sensor comprises a second thermistor, the first and second thermistors being coupled in series between reference voltages to provide a voltage divider coupled to one input of a first differential amplifier, a second input of the differential amplifier being coupled to a first fixed voltage reference, the differential amplifier providing an output for disabling the switching means.

6. The apparatus of claim 5, further comprising a second differential amplifier coupled to the first and second thermistors and to a second fixed voltage reference, the first and second differential amplifiers having opposite input polarities, whereby the first and second differential amplifiers provide an output signal for disabling the switching means when the ambient temperature and the reference temperature differ by a predetermined amount in opposite directions, respectively.

7. The apparatus of claim 6, further comprising logic gating coupled to outputs of the first and second differential amplifiers for disabling the switching means as a function of outputs of the first and second differential amplifiers.

8. The apparatus of claim 7, further comprising a relay and a relay driver responsive to the logic gating, the relay having contacts in series with the bimetal switch for opening a circuit including the bimetal switch whereby the switching means is disabled.

9. The apparatus of claim 6, further wherein the first and second fixed voltage references are selectable by selection of resistance, and wherein the predetermined amount is thereby settable to different amounts in said opposite directions.

10. The apparatus of claim 5, wherein the first and second temperature sensors are coupled to a pair of comparators, respectively operable to detect a positive temperature difference and a negative temperature difference between the first and second temperature sensors, and further comprising a third temperature sensor coupled to a second pair of comparators operable to detect absolute temperatures of the third temperature sensor above and below predetermined absolute temperature setpoints.

11. The apparatus of claim 10, wherein the predetermined absolute temperature setpoints include a high temperature cutoff substantially equal to an upper limit setpoint of the thermostat and a low temperature circuit inhibit temperature, one of the second pair of comparators sensing the high temperature cutoff being coupled to the switching means for preventing generation of the signal calling for heating, and another of the second pair of comparators sensing a low temperature safety temperature, and enabling operation of the thermostat to generate the signal calling for heating, regardless of the temperature difference of the first and second temperature sensors.

\* \* \* \* \*